:# 2,890,223

1-BENZYL, 2-METHYL, 5-METHOXY TRYPTAMINE

Dilworth Woolley and Elliott N. Shaw, New York, N.Y., assignors to Research Corporation, New York, N.Y., a corporation of New York No Drawing. Application March 22, 1956
Serial No. 573,098

1 Claim. (Cl. 260—319)

This invention relates to new compounds having antipressor activity and to method of making them. These compounds have application in the reduction of high blood pressure induced in experimental animals or found in human patients.

We have found that 5-lower alkoxy-tryptamines substituted by lower alkyl or aralkyl groups in at least one of the positions 1- and 2- are effective in counteracting the hypertensive action of serotonin. These compounds are in this way active both orally and by intravenous injection. The additional substitution of lower alkyl groups such as methyl in the aliphatic amino group also yields biologically active compounds. Typical of the antipressor substances of the invention are 1-benzyl-2-methyl-5-methoxytryptamine,
2-methyl-5-methoxytryptamine,
1-benzyl-5-methoxytryptamine,
1,2-dimethyl-5-methoxytryptamine, and
1-benzyl-2-methyl-5-methoxy-N,N-dimethyl-tryptamine.

Compounds of the invention having a benzyl group in the 1 position are particularly effective.

1-benzyl-2-methyl-5-methoxytryptamine (1-benzyl-2,5-dimethylserotonin) is particularly useful because of its high oral effectiveness, its long period of effectiveness and the absence of undesirable side effects. Dogs have been found to be given effective protection against the pressor effect of serotonin by the oral administration of about 1 mg. of 1-benzyl-2,5-dimethyl analog per kg. of body weight.

The compounds of the invention may be prepared by reduction of the correspondingly substituted 3-indoleacetamides with amide group reducing agents such as lithium aluminum hydride.

The 3-indoleacetamides may be obtained from p-alkoxy (or aralkoxy)-phenylhydrazones of methyl levulinate or succinaldehyde acid by Fischer rearrangement to the 3-indoleacetic acids or esters followed by amidation of the acids by heating with urea.

The compounds of the invention are preferably isolated and administered in the form of their water-soluble addition salts with non-toxic inorganic or organic acids, such as hydrochloric or citric acids.

The compounds of the invention may be represented by the formula

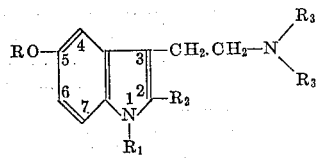

wherein R is lower alkyl, and $R_1$, $R_2$ and $R_3$ are hydrogen, lower alkyl or lower aralkyl, at least one of $R_1$ and $R_2$ being lower alkyl or lower aralkyl.

The following examples are illustrative of the principles of the invention:

Methylation and benzylation of p-methoxyphenylhydrazine.—p-Methoxyphenylhydrazine was prepared from p-anisidine. (K. G. Blaikie and W. H. Perkin, J. Chem. Soc., 125, 296 (1924).) The alkylations followed the method of Audrieth, Weisiger and Carter. (L. F. Audrieth, J. R. Weisiger and H. E. Carter, J. Org. Chem. 6, 417 (1941).) However, the product was isolated as the hydrochloride because this salt was more stable than the free base. This was achieved by extraction of the base with ether, and, after removal of the solvent, addition of alcoholic HCl. The hydrochlorides crystallized readily in high purity on concentration.

Asym - methyl - p-methoxyphenylhydrazine hydrochloride was obtained in a yield of 53%, M.P. 140–142°, after recrystallization from alcohol and ether.

Asym-N-benzyl-p-methoxyphenylhydrazine hydrochloride was obtained in a 50% yield, M.P. 140–142° dec.

2 - methyl - 5 - methoxy-3-indoleacetic acid.—General method.—p-Methoxyphenylhydrazine was liberated from the tin complex, dried, and used without purification. The hydrazine (22 g.) was dissolved in glacial acetic acid (45 ml.). Addition of water (150 ml.) precipitated a small amount of material which was removed by filtration. Methyl levulinate (25 ml.) was added to the filtrate. The crystalline hydrazone that formed was filtered, washed with water and dried in a desiccator. The yield, M.P. 84–86°, was 75–86%, depending on the quality of the hydrazine used.

For the Fischer rearrangement, the hydrazone (32 g.) was refluxed for one hour with 2 N ethanolic MCl (320 ml.) protected from moisture. The mixture was then concentrated under reduced pressure to a small volume, and the residue partitioned between water (100 ml.) and benzene (250 ml.). The organic layer was washed with aqueous sodium bicarbonate, dried over anhydrous magnesium sulfate, and concentrated at about 15 mm. to leave ethyl 2-methyl-5-methoxy-3-indoleacetate as an oil, 28.2 g.

For saponification, the ester was taken into ethanol (300 ml.) to which 6 N NaOH (25 ml.) was added. After three hours at room temperature, water (150 ml.) was introduced and the alcohol removed in an air stream. The aqueous solution was filtered and acidified with 6 N hydrochloric acid. The crystalline precipitate was filtered with suction, washed with water, and dried in a desiccator to yield 24.7 g., M.P. 157–159°.

1-methyl-5-methoxy-3-indoleacetic acid.—Asym-methyl-p-methoxyphenylhydrazine hydrochloride (4.4 g.) in water (50 ml.) was treated with N NaOH (2.3 ml.) followed by a solution of succinaldehyde acid prepared (S. W. Fox and M. W. Bullock, J. Am. Chem. Soc., 73, 2754, (1951)) from glutamic acid (0.05 mole). The pH was adjusted to 4-4.5 and the crystalline hydrazone which formed was filtered, washed with water, and dried in a vacuum desiccator to yield 3.7 g., M.P. 127–128°. The hydrazone was then converted to the indoleacetic acid as described for the 2-methyl isomer.

1-benzyl-5-methoxy-3-indoleacetic acid.—Asym-N-benzyl-p-methoxyphenylhydrazine hydrochloride (3.0 g.) was brought into solution in water (100 ml.) by stirring with 3 N NaOH (5 ml.) followed by glacial acetic acid (30 ml.). A solution at pH 4.5 of succinaldehyde acid from glutamic acid (0.03 mole) was added and the mixture left at 4° overnight. The granular precipitate, after washing, and desiccation in vacuo, weighed 2.7 g., M.P. 101–103°. This hydrazone was subjected to the Fischer rearrangement as described above.

1-benzyl-2-methyl-5-methoxy - 3 - indoleacetic acid.— Asym-N-benzyl-p-methoxyphenylhydrazine hydrochloride (1.32 g.) in water (100 ml.), 3 N NaOH (30 ml.) and glacial acetic acid (40 ml.) gave little reaction when methyl levulinate (3 ml.) was added. With increased alkali (30 ml. of 6 N NaOH) and cooling, separation of an oily hydrazone was completed. This was taken into benzene, washed with aqueous sodium bicarbonate, and dried. After removal of the solvent, the residue was treated with ethanolic HCl as described above.

*2 - methyl-5-benzyloxy-3-indoleacetic acid.*—p-Benzyloxyphenylhydrazine was prepared in the same way as the p-methoxy compound. The free base (7.0 g.) was dissolved in glacial acetic acid (60 ml.) and water (30 ml.). Methyl levulinate (6 ml.) was added and the crystalline hydrazone was filtered, washed with aqueous acetic acid and dried in vacuo to yield 9 g., M.P. 95–98°. When this was subjected to the Fischer rearrangement as described in the general example, the acid obtained could not be crystallized. The amide obtained from it was crystalline.

*2 - methyl-5-methoxy - 3 - indoleacetamide.—General method for amides.*—2 - methyl-5-methoxy-3-indoleacetic acid (7.0 g.) and urea (7.0 g.) were placed in a flask provided with an air condenser and heated in an oil-bath kept at 180–185° for 2.5 hours. The cooled melt was brought into solution with ethyl acetate (150 ml.) and N HCl (30 ml.). The organic layer was washed with aqueous bicarbonate from which unreacted starting material was obtained on acidification (5–10% recovery). After drying over magnesium sulfate, the ethyl acetate was concentrated to a small volume (ca. 35 ml.) and left overnight for crystallization. Slow crystallization was necessary to obtain both good yields and highest purity. The yield, based on unrecovered acid, was 3.8 g., M.P. 147–150°.

The other amides listed in Table I below were prepared by this procedure. In some cases the heating was carried out at 190–195° for one and one-half hours with equal success. The amides were crystallized from a concentrated solution in the solvent indicated.

*2-methyl - 5 - methoxy - 3 - indole-N,N-dimethylacetamide.—General method for dimethylamides.*—This procedure differed from the direct amidification with urea in that, since tetramethylurea is quite soluble in organic solvents, special care was taken to ensure its removal. 2-methyl-5-methoxy-3-indoleacetic acid (2.5 g.) and tetramethylurea (2.5 g.) were heated two hours at 195°. The mixture was cooled and triturated with water containing a little hydrochloric acid to remove the excess oily urea which otherwise prevented crystallization of the amide. After decantation of the aqueous washings, the gummy residue was dissolved in ethyl acetate from which starting acid (0.51 g.) was recovered by extraction with aqueous bicarbonate. The organic layer was then dried over magnesium sulfate and concentrated to a small volume for crystallization. When, in the case of some acids, the amide was difficult to crystallize, the neutral residue was reduced without further purification.

*Reduction of substituted 3-indoleacetamides.*—The following standardized procedure was adopted. Lithium aluminum hydride amounting in weight to about one-half that of the amide to be reduced was suspended in dry ether (roughly 500 ml. per g.). After the suspension had been stirred for some time and the larger lumps dispersed, the powered amide was added. Stirring was continued for two days. The excess hydride was decomposed by the very cautious and slow addition of 20% aqueous sodium potassium tartrate just sufficient to cause the ether layer to separate clearly. The ether phase was decanted from the mushy aqueous residue into a separatory funnel and extracted with 0.1 N HCl (1.5 equivalents per mole of amide reduced) in three portions. In some cases the hydrochloride was isolated by concentration of the aqueous layer to a glass which was crystallized by addition of a small amount of absolute ethanol. In the cases of 1-benzyl-2-methyl 5-methoxytryptamine and 1-benzyl-2-methyl-5-methoxy-N,N-dimethyltryptamine, the hydrochloride crystallized directly in the acid extracts before concentration. Sometimes, however, the tryptamines were isolated as picrates when initially prepared. The acid extracts were warmed in an air stream to remove ether, then poured into hot 5% alcoholic picric acid (a small excess over theory was used). The precipitate was recrystallized from aqueous alcohol or acetone. The hydrochlorides were crystallized from absolute alcohol and the suspension was thinned with ether before filtration. In Table II the yield is given opposite that salt which was used for isolation.

TABLE I

*3-indoleacetic acids and amides*

| | Solvent | M.P., °C. | Yield, Percent |
|---|---|---|---|
| 3-Indoleacetic acid: | | | |
| 1-Methyl-5-methoxy | (c) | 136–138 | a 71 |
| 2-Methyl-5-methoxy | (c) | 161–162 | a 84 |
| 2-Methyl-5-benzyloxy | (c) | Oil | a 70 |
| 1,2-Dimethyl-5-methoxy | (c) | 169–171 | b 59 |
| 1-Benzyl-5-methoxy | (c) | 126 | b 51 |
| 1-Benzyl-2-methyl-5-methoxy | (c) | 174–175 | b 86 |
| 3-Indoleacetamide: | | | |
| 1-Methyl-5-methoxy | (c) | 227–228 | 48 |
| 2-Methyl-5-methoxy | (d) | 149–150 | 57 |
| 2-Methyl-5-benzyloxy | (c) | 143–144 | 35 |
| 1,2-Dimethyl-5-methoxy | (d) | 164–165 | 66 |
| 1-Benzyl-5-methoxy | (c) | 156–157 | 60 |
| 1-Benzyl-2-methyl-5-methoxy | (d) | 130–131 | 54 |
| 3-Indole-N,N-dimethylacetamide: | | | |
| 2-Methyl-5-methoxy | (d) | 134–135 and 152–153 | 40 |
| 1-Benzyl-2-methyl-5-methoxy | (d) | 148–149 | | a Yield from the hydrazone.
b Yield from the substituted phenylhydrazine.
c Ethanol.
d Ethyl acetate with added hexane.

TABLE II

*Analogs of serotonin*

| | M.P., °C. | Yield in hydride reduction, percent |
|---|---|---|
| 1-Methyl-5-methoxytryptamine picrate | 189–190 | 47 |
| 1-Methyl-5-methoxytryptamine hydrochloride | 176–177 | |
| 1-Benzyl-5-methoxytryptamine picrate | 166–167 | 51 |
| 2-Methyl-5-methoxytryptamine picrate | 216–217 | 48 |
| 2-Methyl-5-methoxytryptamine hydrochloride | 179–180 | |
| 2-Methyl-5-benzyloxy tryptamine picrate | 207–208 | 40 |
| 1,2-Dimethyl-5-methoxytryptamine picrate | 197–198 | |
| 1,2-Dimethyl-5-methoxytryptamine hydrochloride | 230–232 | 44 |
| 1-Benzyl-2-methyl-5-methoxytryptamine hydrochloride | 230–231 | 60 |
| 2-Methyl-5-methoxy-N,N-dibenzyltryptamine hydrochloride | 221–223 | |
| 2-Methyl-5-methoxy-N,N-dimethyltryptamine picrate | 147 and 182 | 71 |
| 1-Benzyl-2-methyl-5-methoxy-N,N-dimethyltryptamine hydrochloride | 191–192 | 85 |

We claim:
1-benzyl-2-methyl-5-methoxytryptamine.

References Cited in the file of this patent
UNITED STATES PATENTS

| | | |
|---|---|---|
| 2,416,258 | Jenkins et al. | Feb. 18, 1947 |
| 2,621,187 | Jones et al. | Dec. 9, 1952 |
| 2,701,250 | Fox et al. | Feb. 1, 1955 |
| 2,701,251 | Fox et al. | Feb. 1, 1955 |
| 2,704,763 | Koehneke et al. | Mar. 22, 1955 |
| 2,708,197 | Speeter | May 10, 1955 |
| 2,715,129 | Hamlin | Oct. 9, 1955 |
| 2,728,778 | Speeter | Dec. 27, 1955 |

OTHER REFERENCES

Cook et al.: Chem. Abstracts, vol. 46, col. 2048 (1952).
Cook et al.: Chem. Abstracts, vol. 47, col. 8083 (1953).